(12) United States Patent
Zhao et al.

(10) Patent No.: US 7,796,494 B2
(45) Date of Patent: Sep. 14, 2010

(54) ASYMMETRIC WRITE FOR FERROELECTRIC STORAGE

(75) Inventors: Tong Zhao, Pittsburgh, PA (US); Andreas Roelofs, Eden Prairie, MN (US); Martin Forrester, Murrysville, PA (US)

(73) Assignee: Seagate Technology, LLC, Scotts Valley, CA (US)

( * ) Notice: Subject to any disclaimer, the term of this patent is extended or adjusted under 35 U.S.C. 154(b) by 219 days.

(21) Appl. No.: 12/198,419

(22) Filed: Aug. 26, 2008

(65) Prior Publication Data

US 2010/0054111 A1   Mar. 4, 2010

(51) Int. Cl.
*G11B 9/00* (2006.01)
(52) U.S. Cl. .................................... 369/126
(58) Field of Classification Search ................ 369/126
See application file for complete search history.

(56) References Cited

U.S. PATENT DOCUMENTS

| | | | |
|---|---|---|---|
| 5,777,977 A * | 7/1998 | Fujiwara et al. | 369/126 |
| 5,985,404 A * | 11/1999 | Yano et al. | 428/846.1 |
| 7,391,706 B2 | 6/2008 | Nauka | |
| 2004/0090903 A1 * | 5/2004 | Cho et al. | 369/126 |
| 2005/0052984 A1 | 3/2005 | Hong | |
| 2006/0023606 A1 | 2/2006 | Lutwyche | |
| 2006/0153049 A1 | 7/2006 | Park | |
| 2006/0219655 A1 * | 10/2006 | Cho et al. | 216/22 |
| 2007/0041233 A1 | 2/2007 | Roelofs | |
| 2008/0002502 A1 * | 1/2008 | Saho | 365/217 |
| 2008/0175133 A1 * | 7/2008 | Roelofs et al. | 369/126 |
| 2009/0034405 A1 * | 2/2009 | Jeon et al. | 369/126 |

* cited by examiner

*Primary Examiner*—Thang V Tran
(74) *Attorney, Agent, or Firm*—Campbell Nelson Whipps LLC

(57) ABSTRACT

A method of writing to ferroelectric storage medium includes the steps of applying a first write voltage to a ferroelectric layer for writing a first bit in a first polarization direction and applying a second write voltage to the ferroelectric layer for writing a second bit in a second polarization direction opposing the first polarization direction. The first write voltage having a first magnitude, and the second write voltage having a second magnitude being greater than the first magnitude. The ferroelectric layer having a ferroelectric imprint polarization direction, and the first polarization direction being substantially the same as the ferroelectric imprint polarization direction. The ferroelectric medium contains first bits with a first surface area that is substantially equal to second bits surface area. A probe storage apparatus can use this method and ferroelectric medium.

20 Claims, 4 Drawing Sheets

ASYMMETRIC WRITE FOR FERROELECTRIC STORAGE

BACKGROUND

The reversibility of the spontaneous polarization makes ferroelectric materials promising candidates for use as storage media in future non-volatile memory devices. Binary information is stored in the two remanent polarization states by applying an appropriate switching voltage to a ferroelectric capacitor. After poling the capacitor into the desired state, the polarization is preserved without the application of an external field.

Ferroelectric materials can form the basis for data storage devices, where digital "1" and "0" levels are represented by the electric polarization of a ferroelectric film pointing "up" or "down". Storage devices based on a ferroelectric storage medium include Ferroelectric Random Access Memory (Fe-RAM) and scanning-probe storage systems ("FE-probe").

In a FeRAM memory cell the storage element includes a thin ferroelectric film sandwiched between fixed, conductive electrodes. To write a bit to such a cell, a voltage pulse of either positive or negative polarity is applied between the electrodes in order to switch the internal polarization of the ferroelectric film to the "up" or "down" state, respectively. To read back the data from the FeRAM cell, a read voltage of a certain polarity (e.g. positive) is applied, which switches the polarization of the ferroelectric film in cells storing a "0" ("down" polarization), while having no effect in cells storing a "1". A sense amplifier measures the charge flow that results when the polarization switches, so that a current pulse is observed for cells which stored a "0", but not for cells which stored a "1", thus providing a destructive readback capability.

Probe storage devices have been proposed to provide small size, high capacity, low cost data storage devices. A probe storage device based on ferroelectric thin films uses one or more small, electrically conducting tips as movable top electrodes to store binary information in spatially localized domains. Binary "1's" and "0's" are stored in the media by causing the polarization of the ferroelectric film to point "up" or "down" in a spatially small region (domain) local to the electrode, by applying suitable voltages to the electrode. Data can then be read out by a variety of means, including sensing of piezoelectric surface displacement, measurement of local conductivity changes, or by sensing current flow during polarization reversal (destructive readout).

In ferroelectric probe storage, a conducting probe tip scans on the surface of a ferroelectric media to provide an electric field on the media for write and/or read. The track width of a probe storage is nominally defined by the dimension of the probe tip perpendicular to the scan direction, while the bit length by the distance of the probe tip travels along the scan direction with a certain applied electric voltage; both of them are based on an assumption that the electric field from the probe tip only affects the ferroelectric media underneath the tip footprint. Actual media area affected by an electrically biased probe tip, however, is larger than the tip footprint due to fringing electric field from the tip, which is called electric field blooming effect. Ferroelectric imprint causes the blooming on up and down bits to be an asymmetric size. In other words, the written bit size with a certain polarization state is different from that with opposite state. As a result, a polarization-dependent variation of track width and bit length is induced, which is undesirable for a ferroelectric probe storage device. A non-uniform track width would lead to erasure of neighboring tracks and would cause strong variations in the signal magnitude for opposite bit states ("1" and "0"), which would complicate the data analysis and reduce the ultimate storage density. A non-uniform bit length will cause an additional jitter, an increase of the bit error rate and an overall reduced writability/readability especially for high areal density.

Therefore, therefore the compensation of the asymmetric blooming effect on bit size with opposite polarization directions caused by ferroelectric imprint in ferroelectric probe storage. There is also a need to improve writability and write voltage efficiency in other thin-ferroelectric film based memory systems.

BRIEF SUMMARY

The present disclosure relates to an asymmetric write for ferroelectric probe storage. In particular, the present disclosure relates to the use of asymmetric voltages to write bits with opposite polarization directions. A lower voltage is used to write bits into the preferred (imprinted) polarization direction that is the same as in the as-grown film; while a higher voltage for bits with non-preferred polarization direction that is opposite to the as-grown direction. By doing that, the influence of ferroelectric imprint on the actual area affected by the electric field blooming is compensated, uniform track width and bit length between bits with opposite polarization directions are realized, and the writability/readability at high real density is achieved.

One illustrative method of writing to ferroelectric storage medium includes the steps of applying a first write voltage to a ferroelectric layer for writing a first bit in a first polarization direction and applying a second write voltage to the ferroelectric layer for writing a second bit in a second polarization direction substantially opposing the first polarization direction. The first write voltage having a first magnitude, and the second write voltage having a second magnitude being greater than the first magnitude. The ferroelectric layer having a ferroelectric imprint polarization direction, and the first polarization direction being substantially the same as the ferroelectric imprint polarization direction.

An illustrative ferroelectric medium includes a ferroelectric layer having a ferroelectric imprint polarization direction. The ferroelectric layer includes a plurality of first bits having a first polarization direction and each bit having a first surface area on the ferroelectric layer. The first polarization direction is substantially the same as the ferroelectric imprint polarization direction. The ferroelectric layer includes a plurality of second bits having a second polarization direction substantially opposing the first polarization direction and each bit having a second surface area on the ferroelectric layer. The second surface area is within 10% of the first surface area.

An illustrative probe storage apparatus includes a ferroelectric layer, an array of probes for reading data from the ferroelectric layer and writing data to the ferroelectric layer and an actuator for moving the ferroelectric layer with respect to the probes. The ferroelectric layer has a ferroelectric imprint polarization direction and a plurality of first bits having a first polarization direction that is substantially the same as the ferroelectric imprint polarization direction and each bit having a first surface area on the ferroelectric layer and a plurality of second bits having a second polarization direction substantially opposing the first polarization direction and each bit having a second surface area on the ferroelectric layer. The probes are configured to apply a first write voltage having the first polarization direction and a first magnitude. The probes are configured to apply a second write voltage having the second polarization direction and a second magnitude. The second magnitude is greater than the first magnitude.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The present disclosure relates to an asymmetric write for ferroelectric storage. In particular, the present disclosure relates to the use of asymmetric voltages to write bits with opposite polarization directions. A lower voltage is used to write bits into the preferred (imprinted) polarization direction that is the same as in the as-grown film; while a higher voltage for bits with non-preferred polarization direction that is opposite to the as-grown direction. By doing that, the influence of ferroelectric imprint on the actual area affected by the electric field blooming is compensated, uniform track width and bit length between bits with opposite polarization directions are realized, and the writability/readability at high areal density is achieved. While the present disclosure is not so limited, an appreciation of various aspects of the disclosure will be gained through a discussion of the examples provided below.

Figure 1:
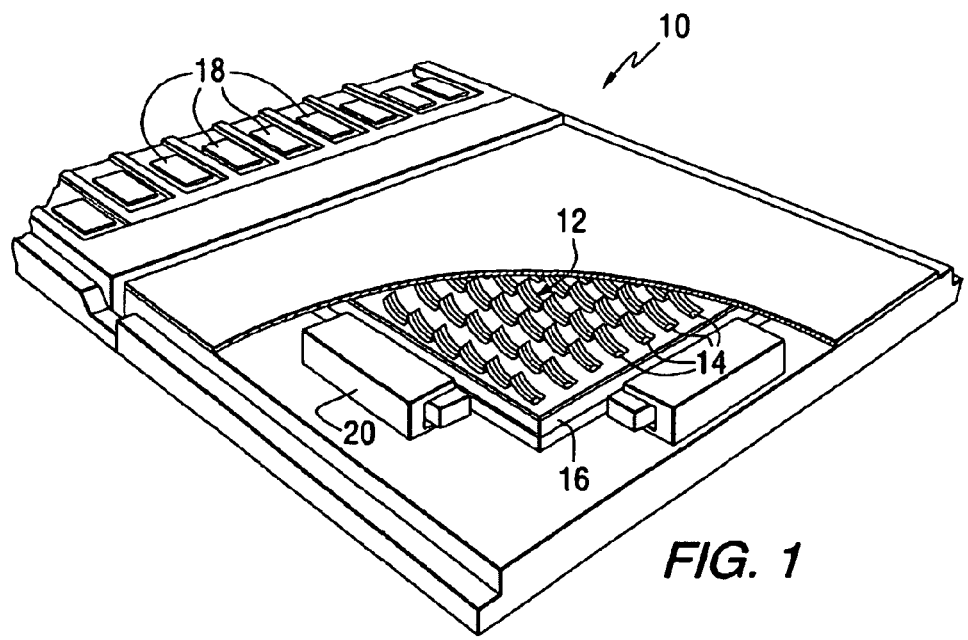
FIG. 1 is an isometric view of an exemplary ferroelectric probe storage device.

FIG. 1 is a perspective view of an illustrative ferroelectric storage device 10. The ferroelectric storage device 10 includes an array 12 of ferroelectric heads 14 positioned adjacent to a storage medium 16. In many embodiments, the array 14 and the medium 16 are planar and extend generally parallel with each other. The array 14 includes a plurality of electrodes (also referred to as tips), which are operably coupled to connectors 18.

The storage medium 16 is coupled to at least one actuator 20, which is configured to move the medium 16 relative to array 12 or the array relative to the medium 16. This movement causes the ferroelectric heads to be moved relative to the individual ferroelectric domains on medium 16. Each head can include one or more electrodes. To address the destructive readback of data, one technique reserves at least one sector on the storage medium 16, which is available for writing data during a read operation. This available sector is thereby used to reproduce the data, which is being destructively read back. Other techniques rewrite the data to the same domain or to other locations on the media.

Figure 2:
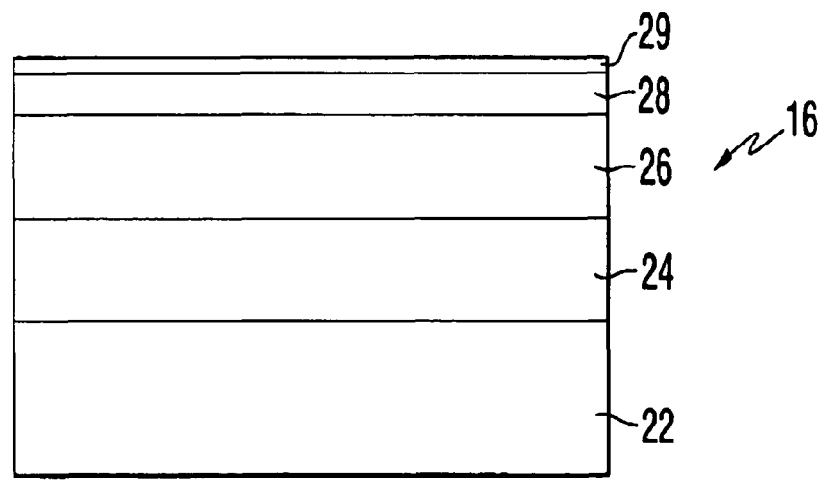
FIG. 2 is a cross-sectional schematic diagram of a portion of a ferroelectric storage medium.

FIG. 2 is a cross-sectional schematic diagram of a portion of a ferroelectric storage medium 16. In this embodiment the storage medium includes a substrate 22, which can be for example Si, a first layer 24 which can be for example $SrTiO_3$ positioned on the substrate, a layer 26 which can be for example $SrRuO_3$ positioned on the first layer, and a ferroelectric layer 28 which can be for example lead zirconium titanate (PZT) ($PbZr_xTi_{1-x}O_3$) positioned on the second layer. Other intermediate layers may be used to align the structures between the substrate and the PZT film, as desired. In addition, the PZT layer can be doped with other materials, such as lanthanum. Other materials can be used also.

Due to electric field spreading in the ferroelectric film, a thin ferroelectric layer is needed for high bit densities. The domain wall stability may improve with thinner films, thereby providing better thermal stability. A top layer 29 can be included to minimize wear of the cantilever electrodes. This material can be liquid or solid lubricant with a high dielectric constant. In one example, the first layer 24 has a thickness of about 100 nm, the second layer 26 has a thickness in the range from about 50 nm to about 100 nm, and the ferroelectric layer 28 has a thickness in the range of 10 to 30 nm. The top layer 29 can have a thickness of 1-3 nm.

Figure 3:
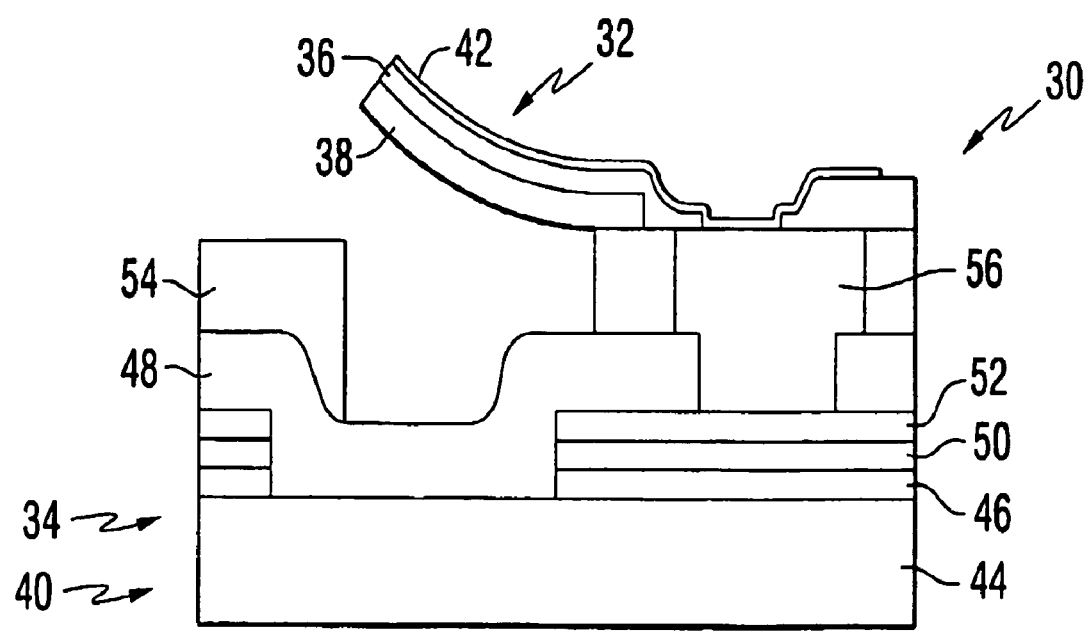
FIG. 3 is a schematic diagram of one illustrative embodiment of a probe electrode, and its mechanical and electrical support structures.

FIG. 3 is a schematic diagram of one illustrative embodiment of a probe head assembly 30 including a lever 32, and its mechanical and electrical support structures 34, designed for scanning probe storage. The probe lever 32 includes a pair of thin films 36 and 38 (bilayer), deposited on a substrate 40 containing other supporting films and/or electronic circuitry, and whose biaxial stress levels are chosen to ensure that the bilayer wants to bend up from the underlying substrate. This can be achieved by choosing the lower film 36 in the bilayer to have more compressive biaxial stress than the second layer 38 in the bilayer. This stressed bilayer is deposited overlapping a sacrificial layer (not shown in FIG. 3), which is removed selectively by a chemical process, so that the bilayer will bend up from the substrate when the sacrificial layer is removed. The bilayer has a suitable metal or conductive metal-oxide layer 42 (referred to as an electrode or tip) attached to it, so that the lever substrate can be brought in proximity to the ferroelectric media, and the probe metal brought in electrical contact with the media to allow data reading and writing. The probe metal is chosen to be mechanically hard (to resist wear), to be chemically compatible with the media (to avoid media or electrode degradation), and to have high electrical conductivity in both its bulk and surface. Electronic circuitry can be integrated into the substrate.

In this example, the substrate includes a first layer 44 that supports a first conductor adhesion layer 46 and an insulating layer 48, of for example, alumina. A conductor 50 is positioned on the first conductor adhesion layer 46, and a second conductor adhesion layer 52 is positioned on the conductor 50. A passivation layer 54 is provided on the insulating layer. A conductor plug 56 provides an electrical connection between the conductor 50 and the probe 32 through a via in the passivation layer and the insulating layer. While one electrode is shown in this example, it should be understood that multiple electrodes and other structures could be included in the lever.

This disclosure provides a method and apparatus for providing uniform track width and bit length between bits on a ferroelectric film. The use of asymmetric voltages to write bits with opposite polarization directions provide uniform track width and bit length between bits on a ferroelectric film. A lower voltage is used to write bits into the preferred (imprinted) polarization direction that is the same as in the as-grown film; while a higher voltage for bits with non-preferred polarization direction that is substantially opposite to the as-grown direction. By doing that, the influence of ferroelectric imprint on the actual area affected by the electric field blooming is compensated, uniform track width and bit length between bits with substantially opposite polarization directions are realized, and the writability/readability at high areal density is achieved.

Ferroelectric imprint refers to one polarization state being more favorable than another in a ferroelectric material, which is reflected by an asymmetry in the coercive voltages between these two states. Imprint behavior has been found to be highly variable from sample to sample, between different ferroelectric materials, and between bulk and thin-film samples, leading to the suggestion of several underlying mechanisms, including defect-dipole alignment, bulk screening effects, and interface-dominated screening effects, etc. A sputtered $PbZrTiO_3$ (PZT) media consistently has an "up" polarization direction resulting in a shift of the ferroelectric hysteresis loop along the electric voltage axis towards the negative side. The positive switching voltage is frequently smaller than the negative switching voltage, i.e. the film is easier to switch into its as-deposited polarization direction.

Figure 4:
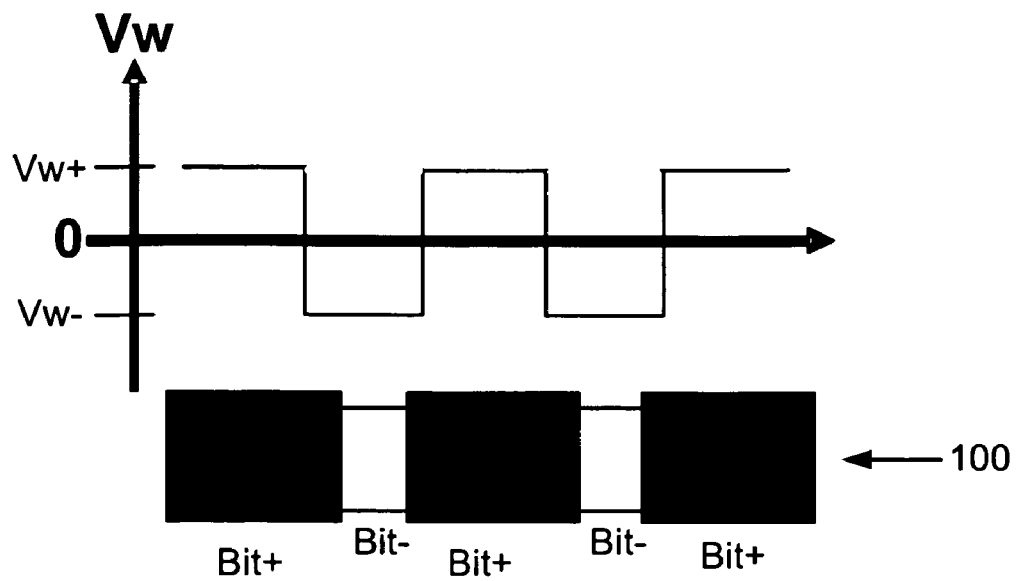
FIG. 4 is a graph that illustrates the application of symmetric write voltage pulses to the relative size of each bit in a bit track.

The actual electric field provided by the probe tip distributes in an area larger than the footprint of the probe tip due to the fringing field. The distributed electric field gets smaller when it is further away from the head. So the area a ferroelectric polarization that can be switched by the probe tip is determined by the dimensions in which the distributed electric field is above the coercive field. As mentioned above, the positive coercive voltage, "+Vc", is lower than the negative one, "−Vc", indicating the film is easier to switch into its as-deposited polarization direction. Therefore, a larger area is expected to be affected by a positive write voltage than by a negative one. In other words, a larger positive bit (bit+) and a smaller negative bit (bit−) will be written when the write voltages are symmetric, $|Vw+|=|Vw-|$. FIG. 4 is a graph that illustrates the application of symmetric write voltage pulses $|Vw+|=|Vw-|$ to the relative size (top view) of each bit in a bit track 100. The positive bit (bit+) is larger than the negative bit (bit−).

As discussed above, different written dimensions between positive bits (bit+) and negative bits (bit−) result in variation in both track width and bit length. When the areal density is low, individual bits are large (e.g., 800 nm) and the influence on the data writability/readability is neglectable. When the areal density increases (e.g., individual bits being 50 nm or less), the influence increases dramatically and will eventually make the written bits extremely asymmetric and cannot be read out properly.

One such an example is when one considers effects associated with inter-symbol interference (ISI), where the state of a bit is influenced linearly by the state of the neighboring bits during the write or read process, or both. For example, a simple cause of ISI upon readback is limited bandwidth in the readback electronics, which can lead to, for example the signal not returning to zero for a zero-bit surrounded by one bits. This effect would then be exacerbated if the zero bit was shorter due to the asymmetry effect discussed here. In general there may be multiple sources of ISI, including bandwidth limits and differences in the shape of the writing and reading edges of the probe head, but in all cases the described asymmetry will lead to an inability to resolve bits as linear densities increase. One example compares data for 800 nm and 50 nm bit length, with a symmetric write (±7 V) and an extremely asymmetric write (0V and −7V) where the up polarization state is not written at all but just left from its as-deposited state. In the symmetric case the down domains get "squeezed out" as the linear density is increased, since the +7V produces much longer bits due to this being the preferred polarization direction of the film. In the completely asymmetric case the opposite happens, with the up domains being squeezed out by the down domains written with −7V.

Figure 5:
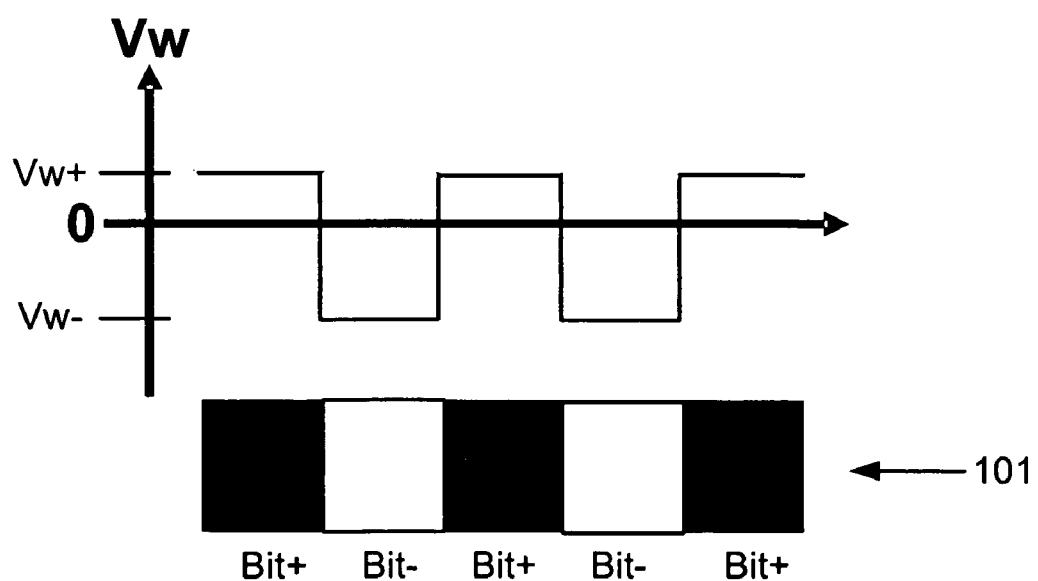
FIG. 5 is a graph that illustrates the application of asymmetric write voltage pulses to the relative size of each bit in a bit track.

In many embodiments, the write voltage is lowered for the preferred or imprinted state, in this particular case the positive write voltage, to compensate the ferroelectric imprint induced bit size asymmetry. Shown in FIG. 5 is a schematic illustration of the write voltage pulse train for the compensation. FIG. 5 is a graph that illustrates the application of asymmetric write voltage $|Vw+|<|Vw-|$ to the relative size (top view) of each bit in a bit track 101. The positive bit (bit+) is substantially the same size as the negative bit (bit−).

Furthermore, an over-compensation appeared to give an opposite asymmetry as the imprint does. Therefore, keeping the negative voltage constant and varying the positive one, is disclosed to find the desired write condition. In one example, readback data at −3V with nominal bit length of 50 nm is presented for write-voltage combinations of +7V/−7V, +3V/−7V, and +1V/−7V (extracted from a data set that included positive write voltages from +7V to 0V). The largest signal amplitude, with the least baseline lift, is obtained for the case of +3V/−7V. This demonstrates the asymmetric write voltage approach helps compensate the ferroelectric imprint induced bit size variation and the associated poor writability and readability at high areal density.

In many embodiments, the write voltage magnitude in the polarization direction opposing the ferroelectric imprint polarization direction is 50% greater, or 100% greater or 150% greater than the write voltage magnitude in the polarization direction the same as the ferroelectric imprint polarization direction. As illustrated in FIG. 4 and FIG. 5, each bit (Bit+ and Bit−) has a surface area equal to the length times the width (the bit tracks 100 and 101 are a top view as disposed on a surface of the ferroelectric layer). As the bit size (largest lateral dimension) is decreased to less than 100 nm or 50 nm, the symmetric write produces Bit+ with large surface areas and Bit− with small surface areas, theses surface areas are at least 50% greater or less than each other. On the other hand, as the bit size (largest lateral dimension) is decreased to less than 100 nm or 50 nm, the asymmetric write produces Bit+ with a surface area and Bit− with a similar surface area, theses surface areas are within 20% or less of each other or within 10% or less of each other or within 5% or less of each other. Thus the asymmetric write produces a uniform bit track 101, illustrated in FIG. 5.

Figure 6:
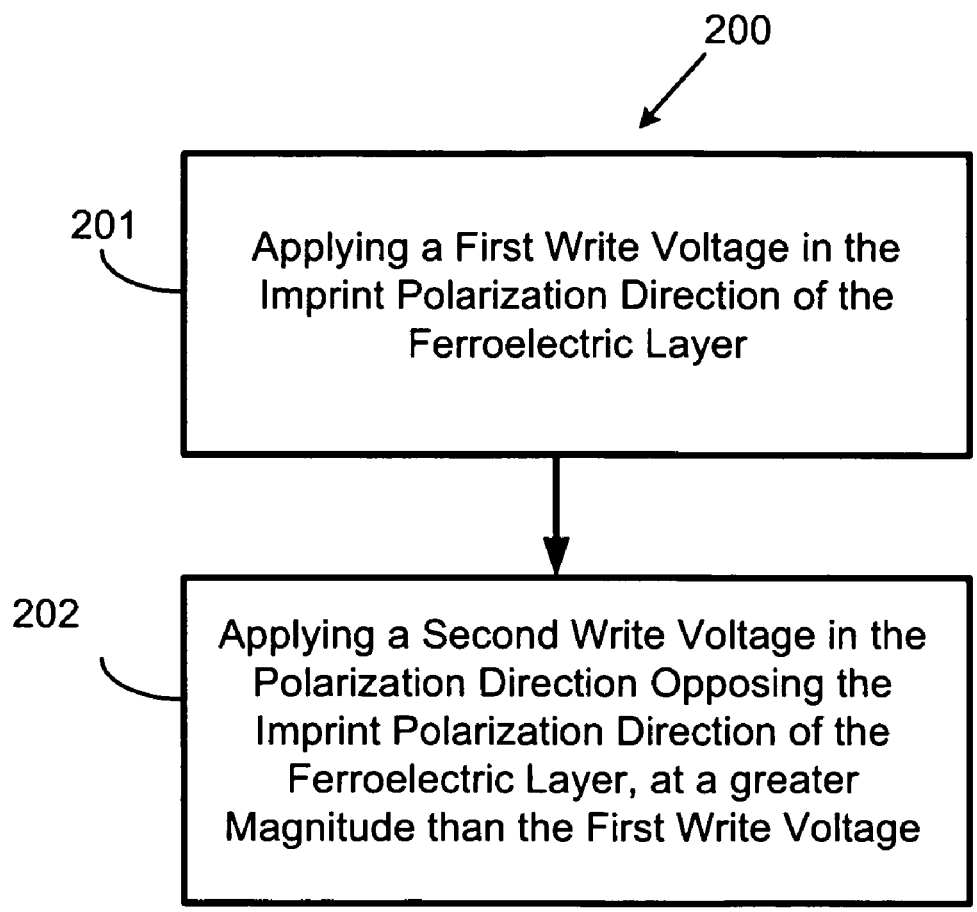
FIG. 6 is a flow diagram of an illustrative method for writing data to ferroelectric medium.

FIG. 6 is a flow diagram of an illustrative method 200 for switching a resistance state of a illustrative ferroelectric probe storage. At block 201, the method includes applying a first write voltage to a ferroelectric layer for writing a first bit in a first polarization direction. The first write voltage has a first magnitude. The ferroelectric layer has a ferroelectric imprint polarization direction, and the first polarization direction is substantially the same as the ferroelectric imprint polarization direction. Then at block 202, the method includes applying a second write voltage to the ferroelectric layer for writing a second bit in a second polarization direction opposing the first polarization direction. The second write voltage has a second magnitude that is greater than the first magnitude.

Thus, embodiments of the ASYMMETRIC WRITE FOR FERROELECTRIC STORAGE are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A method of writing to ferroelectric storage medium comprising steps of:
    applying a first write voltage to a ferroelectric layer for writing a first bit in a first polarization direction, the first write voltage having a first magnitude, the ferroelectric layer having a ferroelectric imprint polarization direction, and the first polarization direction being substantially the same as the ferroelectric imprint polarization direction; and
    applying a second write voltage to the ferroelectric layer for writing a second bit in a second polarization direction substantially opposing the first polarization direction, the second write voltage having a second magnitude being greater than the first magnitude.

2. A method according to claim 1, wherein the second magnitude is at least 50% greater than the first magnitude.

3. A method according to claim 2, wherein the second magnitude is at least 100% greater than the first magnitude.

4. A method according to claim 1, wherein the first write voltage is a positive voltage and the second write voltage is a negative write voltage.

5. A method according to claim 1, wherein the first bit has a first surface area on the ferroelectric layer and the second bit has a second surface area, and the first surface area is within 20% of the second surface area.

6. A method according to claim 5, wherein the first surface area is within 10% of the second surface area.

7. A method according to claim 1, wherein the first bit and the second bit have a largest lateral dimension on the ferroelectric layer of less than 100 nm.

8. A method according to claim 1, wherein the applying a first write voltage step and the applying a second write voltage step are preformed by a probe storage tip.

9. A method according to claim 1, further comprising reading the first bit and the second bit with a probe storage tip.

10. A ferroelectric medium comprising:
    a ferroelectric layer having a ferroelectric imprint polarization direction;
    a plurality of first bits having a first polarization direction and each bit having a first surface area on the ferroelectric layer, the first polarization direction being substantially the same as the ferroelectric imprint polarization direction;
    a plurality of second bits having a second polarization direction substantially opposing the first polarization direction and each bit having a second surface area on the ferroelectric layer, the second surface area being within 10% of the first surface area.

11. A ferroelectric medium according to claim 10, wherein the first bit and the second bit have a largest lateral dimension on the ferroelectric layer of less than 100 nm.

12. A ferroelectric medium according to claim 10, wherein the first surface area and the second surface area are substantially equal.

13. A ferroelectric medium according to claim 10, wherein the ferroelectric layer comprises a lead zirconium titanate material.

14. A probe storage apparatus comprising:
    a ferroelectric layer having a ferroelectric imprint polarization direction and a plurality of first bits having a first polarization direction that is substantially the same as the ferroelectric imprint polarization direction and each bit having a first surface area on the ferroelectric layer and a plurality of second bits having a second polarization direction substantially opposing the first polarization direction and each bit having a second surface area on the ferroelectric layer;
    an array of probes for reading data from the ferroelectric layer and writing data to the ferroelectric layer; and
    an actuator for moving the ferroelectric layer with respect to the probes;
    the probes are configured to apply a first write voltage having the first polarization direction and a first magnitude, and the probes are configured to apply a second write voltage having the second polarization direction and a second magnitude, the second magnitude being greater than the first magnitude.

15. A probe storage apparatus according to claim 14, wherein the first surface area is within 20% of the second surface area.

16. A probe storage apparatus according to claim 15, wherein the first surface area and the second surface area is substantially equal.

17. A probe storage apparatus according to claim 14, wherein the first bit and the second bit have a largest lateral dimension on the ferroelectric layer of less than 100 nm.

18. A probe storage apparatus according to claim 17, wherein the first bit and the second bit have a largest lateral dimension on the ferroelectric layer of less than 50 nm.

19. A probe storage apparatus according to claim 14, wherein the ferroelectric layer comprises a lead zirconium titanate material.

20. A probe storage apparatus according to claim 14, wherein the second magnitude is at least 50% greater than the first magnitude.

* * * * *